May 8, 1962  J. R. ATKINSON  3,033,190
ROTARY GRILL FOR A COOKING DEVICE
Filed March 17, 1960
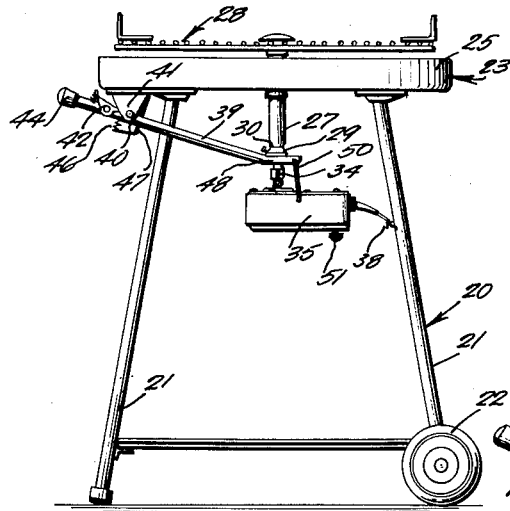
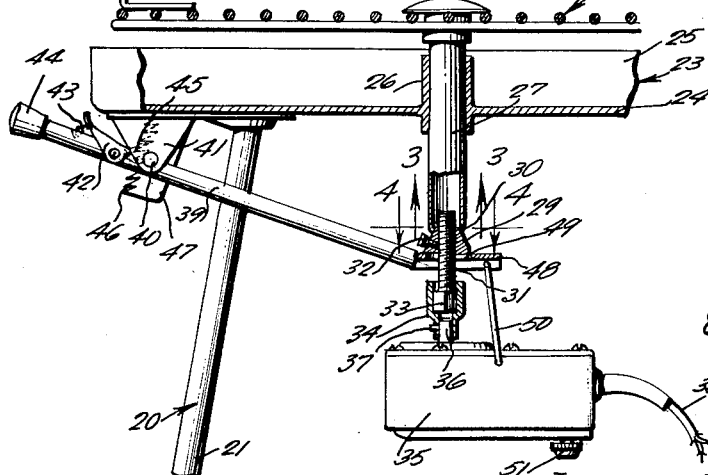
INVENTOR.
James R. Atkinson
BY
Victor J. Evans & Co.
ATTORNEYS United States Patent Office 3,033,190
Patented May 8, 1962

3,033,190
ROTARY GRILL FOR A COOKING DEVICE
James R. Atkinson, 4005 Memorial Parkway NW.,
Huntsville, Ala.
Filed Mar. 17, 1960, Ser. No. 15,568
2 Claims. (Cl. 126—25)

The present invention relates to new and useful improvements in cooking devices, and more particularly to a rotary grill for an outdoor barbecue unit or cooking device.

It is an object of the present invention to provide a rotary grill for an outdoor cooking device wherein the various foodstuffs which are being cooked can be rotated so that the foodstuffs are evenly exposed to the heat of the charcoal or the like, and wherein the grill is adapted to be rotated by a suitable power mechanism such as an electric motor.

A still further object is to provide an outdoor cooking device which includes a rotary grill which is adapted to be rotated by a suitable motor and wherein the driving connection between the motor and the grill is constructed so that the grill will be rotated regardless of the adjusted positions of the parts so that for example when the grill is raised or lowered with respect to the bowl, the motor will continue to rotate the grill so as to insure or provide that the desired rotary action continues to take place.

A further object is to provide a device of this character of simple and practical construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout and in which:

FIGURE 1 is an elevational view of the cooking device provided with the rotary grill of the present invention.

FIGURE 2 is an enlarged elevational view illustrating the present invention, and with parts broken away and in section.

FIGURE 3 is a sectional view taken on the line 3—3 of FIGURE 2.

FIGURE 4 is a sectional view taken on the line 4—4 of FIGURE 2.

FIGURE 5 is a fragmentary elevational view illustrating a modification and with parts broken away and in section.

FIGURE 6 is a sectional view taken on the line 6—6 of FIGURE 5.

Referring in detail to the drawings and more particularly to FIGURES 1 through 4 of the drawings, the numeral 20 indicates an outdoor cooking device which includes the usual legs 21 and wheels 22, and the numeral 23 indicates the bowl of the outdoor cooking device 20, and the bowl 23 is adapted to have charcoal or the like arranged therein in the usual manner. The bowl 23 embodies a horizontally disposed bottom wall 24 as well as an upstanding outer side wall 25.

Arranged centrally with respect to the bottom wall 24 and secured thereto or formed integral therewith is a vertically disposed bearing 26, and the numeral 27 indicates a driven shaft which is rotatably positioned in the bearing 26, there being a rotary grill 28 suitably affixed to the upper end of the shaft 27, the grill 28 being arranged above the bowl 23.

The numeral 29 indicates a bushing which has a frictional driving connection as at 30 with the lower end of the shaft 27, FIGURE 2. The numeral 31 indicates a screw member which is connected to the bushing 29 and a set screw 32 extended through the bushing 29 and engages the screw member 31, there being a shoulder or head 33 on the lower end of the screw member 31. The numeral 34 indicates a sleeve or coupling which serves to connect a stub shaft 36 to the screw member 31, and the stub shaft 36 is driven by a motor 35 which may be connected to a suitable source of electrical energy as at 38. A set screw 37 connects the sleeve 34 to the stub shaft 36 of the motor 35.

There is further provided a means for raising and lowering the grill 28 with respect to the bowl 23, and this means comprises a manually operable lever or handle 39 which is pivotally connected by means of a horizontally disposed pivot pin 40 to a support member 41 which is suitably affixed to the bottom of the bowl 23. The numeral 42 indicates a pawl or dog which forms part of a latching or locking mechanism which serves to help maintain the parts immobile in their adjusted positions, and a spring member 43 is arranged in engagement with the pawl 42, there being a hand grip 44 on the outer end of the lever 39 for facilitating the manual gripping and manipulation thereof. A tooth 45 on the pawl 42 is adapted to engage teeth 46 of a rack bar 47 so as to maintain the parts in their desired positions. When it is desired to raise or lower the grill 28, it is only necessary to manually move the pawl 42 so that its tooth 45 moves out of engagement with the teeth 46 of the bar 47 so that the lever 39 can pivot in a vertical plane about the pin 40 as a horizontal axis.

The lower end portion 48 of the lever 39 is provided with a slot 49 through which extends the screw member 31. The numeral 50 indicates a bail or support member which serves to connect the lower end of the lever to the driving motor 35, so that as the lever is shifted, the motor 35 will also be shifted or raised or lowered. A switch 51 may be provided for controlling actuation of the motor 35.

Referring now to FIGURES 5 and 6 of the drawings, the numeral 52 indicates a modified cooking device which includes a bowl 53 that embodies a horizontally disposed bottom wall 54 as well as an upstanding outer wall member or side wall 55, and the numeral 56 indicates a rotary grill which is connected to the upper end of a drive shaft 57, the shaft 57 extending through a bearing 59 which is arranged centrally of the bottom wall 54.

The numeral 61 indicates a circular flange which is affixed to the lower portion of the shaft 57 for a purpose to be later described.

There is further provided an electric motor 62 which may be controlled by a switch 63, the motor 62 is adapted to be connected to a suitable source of electrical energy by means of conductors or wires 64. The motor 62 is coupled to the lower end of the shaft 57 as for example as at 65.

The numeral 66 indicates a manually operable lever or handle which has a lip or lug 69 on its lower end and is adapted to selectively engage the flange 61 on the shaft 57 as for example when the grill 56 is to be raised. A bail 70 connects the lever 66 to the motor 62 so that as the lever 66 is moved, the motor 62 will likewise be moved.

The numeral 71 indicates a pawl which is provided with a pointed end 72 that is adapted to engage teeth 73 on the stationary bar or support member 67, and the lever 66 is pivotally connected to the bar 67 as at 68.

From the foregoing, it is apparent that there has been provided a rotary grill for an outdoor cooking utensil, and when using the device of FIGURES 1 through 4 for example, it will be noted that the motor 35 is adapted to be connected to a suitable source of electrical energy by means of the wire 38 and the switch 51 can be used for turning the motor 35 on or off. It is to be noted that charcoal or other heating substances or cooking substances of similar nature are adapted to be arranged within the bowl 23, and the foodstuffs being cooked or grilled are adapted to be arranged on the rotary member 28. Thus, hot dogs, hamburgers, steaks, or the like can be arranged on the grill 28. With the motor 35 on, it will be seen that the shaft 36 will be rotated and this will cause rotation of the screw member 31 since the member 34 connects the members 36 and 31 together, and as the member 31 rotates, it will rotate the bushing 29. The lower end of the shaft 27 frictionally engages the upper surface of the bushing 29 so that this rotation of the bushing 29 causes a corresponding rotation of the shaft 27, and since the grill 28 is secured to the upper end of the shaft 27, it will be seen that the grill 28 will likewise be rotated whereby foodstuffs on the grill will be evenly grilled or cooked as it is rotated over the hot coals in the bowl. It is to be noted that the lower end of the shaft 27 is not secured in the bushing 29 but only rests there against so as to provide a type of friction clutch which will permit separation of the elements 29 and 27, in the event that the grill 28 becomes caught on a lump of charcoal or the like so that damage to the motor and its associated parts will be minimized or prevented.

Furthermore, a manually operable means is provided for raising and lowering the grill 28 with respect to the bowl 23 so that the grill can be positioned at any desired elevation and this means includes the lever 39 which is adapted to have its pawl 42 manually moved in order to disengage the dog 45 from the teeth 46 so as to permit the lever 39 to pivot on its pivot pin 40. This pivotal movement of the lever 39, as for example when the lever 39 is pivoted in a counter clockwise direction, FIGURE 2, will cause the bushing 29 to be raised, since the bushing 29 rests on the lower end portion 48 of the lever 39, and as the bushing 29 is lifted upwardly by the lever, the shaft 27 will be moved upwardly in its bearing 26 so as to move the grill 28 upwardly. The slot 49 in the end portion 48 provides sufficient clearance for the screw member 31 to extend therethrough, and it is to be noted that after the lever 39 is moved upwardly or downwardly, the motor 35 will likewise be moved since the bail 50 serves to connect the motor 35 to the lower end portion 48 of the lever. When the pawl 42 is released, the coacting members 45 and 46 will prevent accidental shifting of the lever 39 and its associated parts, so that the grill can be maintained immobile in its desired or adjusted position.

The practical advantage of causing the motor 35 to move with the lever 39 is that there will always be an operative drive connection from the motor 35 to the shaft 27 regardless of the raised or lowered position of the grill so that for example a person can adjust the grill to a desired location in order to achieve fast or slow cooking as desired.

In the modification of FIGURES 5 and 6 the motor 62 can be controlled by the switch 63, the motor 62 being connected to the source of electricity by means of the wire 64, and the motor 62 is coupled as at 65 to the lower end of the shaft 57, the grill 56 being rotatably arranged above the bowl 53, and the grill 56 being connected to the upper end of the shaft 57. As the motor 62 is energized, the shaft 57 will be rotated through the provision of the coupling 65 so as to rotate the grill 56, whereby foodstuffs on the grill 56 can be rotated at a highly effective and efficient manner. By manually moving the pawl 71, the tooth 72 can be disengaged from the teeth 73 of the bar 67 so that the lever 66 can be pivoted on its pivot pin 68 and as for example when the lever 66 is pivoted in a counter clockwise direction, FIGURE 5, its lug 61 will move up and engage the flange 61 which is secured to the shaft 57 so that the shaft 57 can be elevated as for example when the grill 56 is to be raised. As the lever 66 moves upwardly the bail 70 will move upwardly and this will raise the motor 62 so that the grill will continue to be rotated regardless of its adjusted position. The bail 70 may be of the spring wire type so that as shown in FIGURE 6 the end portions of the bail 70 can be manually pressed inwardly in order to disengage the ends of the bail 70 from apertured portions 74 of the motor 62, as for example when the motor is to be disconnected for any reason.

The parts can be made of any suitable material and in different shapes or sizes.

Some of the advantages of the present invention are as follows. There is utilized a simple design so that manufacturing costs are low. Also there is less friction to moving parts and this is advantageous in that there will be longer life of components and less maintenance required. The height of the grill above the coals may be adjusted without affecting the speed of rotation, and no special material such as asbestos is required. The grill is caused to rotate by rotating the supporting spindle or shaft, and it is to be understood that various methods can be used for coupling the motor to the spindle or drive shaft. The spindle can be made in one piece to further reduce manufacturing costs if desired and suitable bearings, braces or the like can be provided wherever desired or required. Also, the motor can be readily detached so that the motor can be used as a spit motor. A direct motor to spindle coupling may be used as shown in FIGURES 5 and 6, or the separate coupling device of FIGURES 1 through 4 can be used. The lifting lever may be of the crank type, as desired. In FIGURES 5 and 6, by compressing the spring type bail 70, the motor can be easily removed for use as a spit motor. The motor may be an A.C. or D.C. electric or other type of motor, and the lever may be of the ratchet type or it may be gear operated or it may be a screw or crank driven type, and the grill may be provided with a hood or it may be of the open type.

With the present invention a conventional spit motor can be used for driving the grill instead of a spit and the grill can be rotated even when being raised or lowered. The bushing or nut 29 has a sloping upper surface which permits it to be introduced into the hollow shaft 27 at the lower end of the shaft, as for example as shown in FIGURE 2, and the lower end of the shaft 27 may have a hexagonal shape and this arrangement permits slippage and functions as a clutch, as for example in the event that the grill becomes caught or hung on coals or the like.

It is advantageous to have the grill rotate throughout the cooking period since heat is usually unevenly distributed about the under side of the grill, and in this manner all food on the grill is exposed to the hottest and least hot points and equal amount of time. In addition to the foregoing, the fuel can be deliberately left out of part of the bowl and thus result in a fuel savings.

Minor changes in shape, size and rearrangement of details coming within the field of invention claimed may be resorted to in actual practice, if desired.

What is claimed is:

1. In a device of the character described, a bowl including a horizontally disposed bottom wall and a side wall rising from the perimeter of said bottom wall, a vertically disposed bearing extending through the central portion of said bottom wall, a driven shaft rotatably and slidably extending through said bearing and having the upper end contiguous to the upper end of said bowl side wall and having the lower end below and spaced from said bowl bottom wall, a horizontally disposed grill secured to the upper end of said shaft for rotation therewith, a manually operable lever arranged in an upwardly sloping direction below and spaced from said bowl bottom wall and having the upper end exteriorly of said bowl and having the lower end adjacent said shaft lower end, a horizontally disposed pivot pin connecting said lever to said bowl for rocking movement in a vertical plane about said pin as an axis, cooperating interengaging means on the lower end of said driven shaft and on the lower end of said lever for effecting vertical movement of said driven shaft responsive to rocking movement of said lever, said interengaging means allowing rotation of said shaft relative to said lower end of said lever, a bail having the midpart thereof carried by the lower end portion of said lever with the legs of said bail extending downwardly, a motor having its shaft vertically disposed and in end to end relation with respect to said driven shaft, said motor being dependingly supported by the ends of said bail, a manually operable spring pressed locking device operatively connected to said lever and selectively engageable with means on said bowl for securing said lever in adjusted pivoted positions, and means operatively connecting the upper end of the shaft of said motor to the lower end of said driven shaft, said motor and driven shaft moving vertically responsive to rocking movement of said lever while said motor is operating to rotate said driven shaft and the grill secured thereto.

2. In a device of the character described, a bowl including a horizontally disposed bottom wall and a side wall rising from the perimeter of said bottom wall, a vertically disposed bearing extending through the central portion of said bottom wall, a driven shaft rotatably and slidably extending through said bearing and having the upper end contiguous to the upper end of said bowl side wall and having the lower end below and spaced from said bowl bottom wall, a circular flange secured to the lower end portion of said shaft, said flange being disposed horizontally and extending entirely around the shaft, a horizontally disposed grill secured to the upper end of said shaft for rotation therewith, a manually operable lever arranged in an upwardly sloping direction below and spaced from said bowl bottom wall and having the upper end exteriorly of said bowl and having the lower end adjacent said shaft lower end, a horizontally disposed pivot pin connecting said lever to said bowl for rocking movement in a vertical plane about said pin as an axis, said lever having a lip on the lower end extending below said flange for selectively engaging said flange, said flange sliding on said lip during rotation of said shaft, a bail having the midpart thereof carried by the lower end portion of said lever with the legs of said bail extending downwardly, a motor having its shaft vertically disposed and in end to end relation with respect to said driven shaft, said motor being dependingly supported by the ends of said bail, a manually operable spring pressed locking device operatively connected to said lever and selectively engageable with means on said bowl for securing said lever in adjusted pivoted positions, and means operatively connecting the upper end of the shaft of said motor to the lower end of said driven shaft, said motor and said driven shaft moving vertically responsive to rocking movement of said lever while said motor is operating to rotate said driven shaft and the grill secured thereto.

References Cited in the file of this patent
UNITED STATES PATENTS

| | | |
|---|---|---|
| 653,619 | Devin | July 10, 1900 |
| 2,057,421 | Dickson | Oct. 13, 1936 |
| 2,490,142 | MacDougal | Dec. 6, 1949 |
| 2,819,667 | Victor | Jan. 4, 1958 |
| 2,879,677 | Baublitz | Mar. 31, 1959 |
| 2,888,965 | Phillips | June 2, 1959 |